3,554,955
PRIMERS FOR COATING SURFACES WITH POLY-
TETRAFLUOROETHYLENE AND POLYTETRA-
FLUOROETHYLENE DISPERSIONS CONTAIN-
ING SUCH PRIMERS
Robert Hartwimmer, Burghausen (Salzach) and Herbert Fitz, Burgkirchen (Alz), Germany, assignors to Farbwerke Hoechst Aktiengesellschaft vormals Meister Lucius & Bruning, Frankfurt am Main, Germany
No Drawing. Filed Nov. 29, 1967, Ser. No. 686,750
Claims priority, application Germany, Dec. 3, 1966,
F 50,846
Int. Cl. C08f 3/24
U.S. Cl. 260—29.6                    4 Claims

ABSTRACT OF THE DISCLOSURE

The present invention relates to polytetrafluoroethylene dispersions for coating surfaces of metal, glass or ceramics. The dispersions contain soluble additives which consists of complex compounds of metal hydroxides, preferably copper-, cadmium- or zinc hydroxide, with 2 to 6 moles of primary amines as ligands, or hydroxozincates. These additives improve the polytetrafluoroethylene coatings in respect of adherence to the substrate and freedom from cracks and voids.

---

The present invention relates to novel primers for coating surfaces of metal, glass and ceramics with polytetrafluoroethylene (hereinafter referred to as "PTFE") and to PTFE-dispersions containing said primers for producing crack-free and scratch-resistant coatings of PTFE which have an excellent adherence to the substrate.

It has already been proposed, after metal surfaces have been subjected to a mechanical or chemical pre-treatment such as roughening, sand-blasting or pickling, immediately to coat said metal surfaces with aqueous dispersions of PTFE and to sinter the coating. Although coatings obtained in this manner are colourless, transparent and harmless from a physiological point of view, they are generally not free from voids and free from cracks only if applied in a very thin coat. It was found that the adherence to the metal surface was insufficient. Coatings of this kind are very sensitive to mechanical stresses; they easily sustain damage and can easily be scratched off and destroyed. Household utensils which have been coated in this manner, such as pots, pans, etc., cannot be worked with hard utensils, such as knives, forks, scrapers, pot-scourers and the like.

These unsatisfactory properties led to a number of proposals to improve said properties. In U.S. Pat. 2,562,117, for example, there is described the addition of a chromic acid solution to a PTFE-dispersion, while with the process described in German Pat. 849,882 there is obtained an improvement of the adherence of PTFE coatings on metals by the use of chromium-containing "primers" on the basis of phosphoric acid. Although coatings obtained by this method showed an improved adhesion, they are not harmless from a physiological point of view on account of the well-known toxicity of the chromium(VI) compound and can, therefore, only be used to a limited extent. PTFE coatings are, as is known, never entirely free from voids; moreover, due to an inappropriate treatment during the period of service, the coating may be damaged so that, for example by boiling water, milk, or hot sauces, small amounts of chromate may be dissolved out. It is not recommendable, therefore, to use utensils which have been coated according to this method in the household, in the pharmaceutical or food industries. Moreover, the chromium-containing PTFE coatings are still very sensitive to scraping and to scratching while the incorporated chromium compounds often impart an ugly and non-uniform appearance to the dyeing of the coating.

Germany Auslegreschrift 1,164,888 and German Pat. 1,167,706 describe mixtures of PTFE and silicone resins for the coating of metal-, ceramics- and glass surfaces, said mixtures yielding hard coatings. Since the two components are well known for the anti-adhesive effect of their surface coatings with respect to foodstuffs or other materials, it was hoped that the combination of the two components would enhance or at least maintain this desired effect. Unexpectedly, however, the contrary was the case; the anti-adhesive effect of such PTFE-silicone coatings is considerably lower than that of pure PTFE coatings.

According to German Pat. 1,083,002, Swiss Pat. 390,740 and U.S. Pat. 2,710,266 relatively well-adhering and fairly durable coatings of PTFE on metals, ceramics or glass are obtained by the admixture of alkali-silicate solutions to the PTFE-dispersions. However, when applied in a thick layer, these coatings are still very liable to become fissured; moreover, it was found upon use that also these coatings are not fully satisfactory as regards their adherence to the metal substrate and the hardness of the surface, and that the serviceable life of such a coated article is very limited.

Now we have found that on surfaces of glass, ceramics and especially metal, coatings of PTFE can be applied which are distinguished by a superior adherence to the substrate, an excellent resistance to mechanical stresses, a substantial freedom from cracks and voids accompanied by harmlessness from a physiological point of view, by adding to the PTFE-dispersions as primers and coat-improving agents metal hydroxides, especially those of zinc and/or cadmium and/or copper, in the form of complex compounds soluble in dispersions.

Soluble complex compounds of the hydroxides of said metals according to the invention are, for example, the di- to hexammines, preferably the tetrammines of these compounds, for example zinc-tetrammine-hydroxide $Zn(NH_3)_4(OH)_2$, cadmium - tetrammine - hydroxide $Cd(NH_3)(OH)_2$ and the copper tetrammine-hydroxide $Cu(NH_3)_4(OH)_2$, and complexes of these hydroxides having a similar structure together with other strong bases, for example hydrazine, methylamine, hexylamine or ethanolamine as ligands.

Furthermore, the salts of the hypothetical hydroxo zinc acids fall into the class of the soluble complex compounds which are used as primers according to the invention. There are suitable above all the alkali-trihydroxo-zincates $Me^I[Zn(OH)_3]$ and alkali-tetrahydroxo-zincates $$Me_2^I[Zn(OH)_4]$$

which are known in solution and which are stable. Especially advantageous are the readily soluble ammonia- or amine complexes of the alkali-hydroxo-zincates, for example 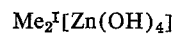.

These complexes are added to the PTFE dispersions at the rate of from 0.2 to 50, preferably of from 2 to 20 percent, calculated on the content of solid PTFE. They improve the properties of the PTFE coatings in many respects. The formation of the coat on drying the dispersion applied to the substrate proceeds according to the process of the present invention without the formation of cracks and substantially without the formation of voids, the coat having an excellent adherence to the substrate. Due to the evaporation of the loosely bound complex forming compound and of part of the solvent, there first separates a gelatinous layer of metal hydroxide and localizes the PTFE. The layer gelatinizes and dries also when applied in a thick layer without contraction so that a smooth, crack-free coat is obtained on the substrate. This is especially characteristic when these coats are compared to the coats obtained with the known dispersions containing additions of chromate or silicate which have hitherto been applied in coating processes; these dispersions form coats on drying which are traversed by a network of fine cracks and crazes so that parts of thicker layers easily come off in the form of small, irregular lamellae, while the dispersion obtained by the process of the present invention dries to give a smooth and entirely crack-free coat, also in processes where several coats are applied. The incorporation of very finely divided metal hydroxide, for example zinc-, cadmium- or copper hydroxide or hydroxo zincate, into the PTFE coat, which takes place already on drying, effects, moreover, that the primers which are present after the sintering process as oxides, impart a certain hardness and resistance to the PTFE coat; nevertheless, the coats still remain elastic and tough in contrast to the silicate-containing coats which become brittle during the sintering process. Probably the forces of subsidiary valency of the metal compounds which are still unsaturated as regards coordination bring about an adherence of the PTFE coat to the substrate which has not been attainable heretofore.

The manufacture of the metal hydroxide complexes used according to the process of the present invention is simple.

Freshly precipitated metal hydroxide, for example the gelatinous zinc hydroxide of high humidity, is introduced as rapidly as possible in the cold into such an amount of the chosen complex forming compound as corresponds at least to the stoichiometric relationship, the precipitate dissolving at once. It is equally suitable to introduce appropriate complex forming compounds in the gaseous state into a suspension of the hydroxides. Sometimes there remain slight turbidities caused by aged hydroxide, which can be eliminated by filtering.

For the preparation of the hydroxo zincates, equivalent amounts of alkali hydroxide are added to the limpid solution of the hydroxide complex. Said method can, of course, be varied in many ways.

For example, a preferred method is the conversion of the respective metal sulfates with calcium hydroxide in the presence of the complex forming compound, in which process the insoluble calcium sulfate is filtered off after some time.

As PTFE-dispersions containing the primers according to the invention, there are predominantly used aqueous dispersions containing 25 to 60 percent by weight of PTFE, which have been stabilized by the addition of wetting agents, for example oxethylated nonyl phenols. After the admixture, they are diluted to the concentration or viscosity required for the respective purpose. For spray-coating, there is generally applied a dispersion of 30 to 40 percent strength, while for spread-coating and dip-coating a dispersion of 40 to 55 percent strength is applied.

A number of the claimed metal hydroxide complexes is obtainable in a crystallized form, which renders it possible to add these complexes immediately prior to the use of the PTFE-dispersions.

If suitable complex forming compounds are employed, also organosol-soluble primers and coat improving agents may be prepared in this manner, for example by the addition of an anhydrous solution of a metal hydroxide/ethanolamine complex to a likewise anhydrous PTFE-formamide dispersion.

In those cases in which the metal to be treated, for example aluminum, is highly sensitive to the action of alkalies, it is recommended when using the above-described zincates to buffer the dispersion which is ready for use to a pH of 9 to 10.

The PTFE-dispersions which have been provided with the primers according to the invention, lend themselves with special advantage to the coating of metallic surfaces with PTFE, for example aluminum, copper, nickel, iron, zinc- or light metal alloys, furthermore also glass, enamel, ceramics, such as stoneware, clay or porcelain. Prior to the coating process, the surfaces to be treated are cleaned and degreased by known methods and subsequently strongly and uniformly roughened either by mechanical means, for example by sand-blasting, grinding with emery, by working with files, rasps or wire brushes, or by chemical means, for example by pickling, and cleaned from the remaining dust or the pickling compounds by means of brushes or by rinsing.

The PTFE coat can be applied in several ways, for example by dipping, spreading or spraying. In the dip-coating process, dispersions of high viscosity are used, while in the spread-coating process it is more advantageous to use a more fluid material.

If it is desired to apply several coats to the substrate, it is suitable after each application of a coat to subject the coat to an intermediate drying with a brief sintering of the coat at temperatures within the range of from 150° to 250° C. After cooling, the next coat is applied. The thickness of a coat is on an average within the range of from about 10 to 20 microns. Depending on the use, a total thickness of about 30 to 80 microns is regarded as sufficient for the coat. After having dried the coat that has been applied last, the total object that has been coated is subjected to a temperature within the range of from 360° to 390° C., and the coat is sintered at this temperature for a period of from 10 to 20 minutes. After the object has cooled off, the coating can be finished by polishing, rolling, pressing or by some other method.

The coatings obtained by the process of the present invention in a conventional thickness are free from cracks and voids to a hitherto unattained extent and are practically colourless and transparent if undyed metal hydroxides have been used.

It is, of course, also possible to dye the PTFE coat in known manner by the addition of pigments that are unaffected by temperature changes, for example titanium dioxide, carbon black, iron oxide, cadmium oxide, cadmium sulfide or the finest metal powders.

The anti-adhesive properties of the polytetrafluoroethylene are fully maintained in all the above-described modifications of the coating process according to the present invention.

The following examples serve to illustrate the invention, but they are not intended to limit it thereto, the percentages being by weight:

EXAMPLE 1

27.3 g. (200 millimoles) of zinc chloride ($ZnCl_2$) were dissolved in 500 ml. of water, and the solution was heated to 40° C. The zinc hydroxide was precipitated, with agitation by the addition of 32 ml. (430 millimoles) of a concentrated ammonia solution (density 0.91 g./ml.). The voluminous, gelatinous precipitate of $Zn(OH)_2$ was rapidly filtered off from the solution, washed with 500 ml. of weak ammonia water and rapidly dissolved, in as moist a state as possible, in 104 ml. (1400 millimoles) of a concentrated ammonia solution (density 0.91 g./ml.). Slight turbidities were filtered off. This solution of zinc-tetrammine-hydroxide was added to 475 g. of an aqueous PTFE-dispersion of 60% strength, so that a dispersion ready for use was obtained which had the following composition:

| | Percent |
|---|---|
| 285 g. polytetrafluoroethylene | 40.00 |
| 14 g. commercial Arkopal® N 090 (nonylphenol ethoxylated with 9 moles ethyleneoxide | 1.96 |
| 20 g. zinc hydroxide | [1] 2.80 |
| 24 g. ammonia ($NH_3$) | 3.37 |
| 370 g. water | 51.87 |
| 713 g. | 100.00 |

[1] Equals 7% calc. on PTFE.

EXAMPLE 2

200 millimoles of the gelatinous zinc hydroxide of high humidity were prepared as described in Example 1 and a strong current of gaseous ammonia was introduced, with agitation. After some time, the viscous mass became more fluid and transparent. As soon as the mass was only slightly turbid, the addition of ammonia was interrupted, the solution was filtered off with suction and the strongly ammoniacal solution was stirred into 333 grams of a PTFE-dispersion of 60% strength.

Composition of the dispersion containing the primer:

| | Percent |
|---|---|
| 200 g. polytetrafluoroethylene | 38.40 |
| 20 g. zinc hydroxide | [1] 3.84 |
| 10 g. Arkopal® N 090 (cf. Ex. 1) | 1.92 |
| 21 g. ammonia (NH$_3$) | 4.04 |
| 270 g. water | 51.80 |
| 521 g. | 100.00 |

[1] 10% calc. on PTFE.

Several coats of this dispersion were applied successively by a dip-coating process with intermediate drying to sheet iron and aluminum sheets which had been pre-treated on both sides by sand-blasting or pickling. Coatings were obtained that had a surface as smooth as glass. After the sintering process, the freedom from cracks and the substantial freedom from voids were examined by inspecting the surface with a sixtyfold magnifying glass, and the excellent adherence of the coats to the substrate was confirmed by a cross-cutting device.

EXAMPLE 3

A solution containing 200 millimoles of zinc-tetramminehydroxide was prepared either by precipitation of zinc hydroxide and redissolution thereof in ammonia, or by converting zinc sulfate with calcium hydroxide in the presence of ammonia, while adding thereto, with agitation, 11 grams (200 millimoles) of powdered potassium hydroxide. The aqueous-ammoniacal solution of potassium-tetrammine-trihydroxozincate $$K[Zn(NH_3)_4(OH)_3]$$

obtained was mixed with 730 g. of a PTFE-dispersion of 60% strength, and a primer-containing dispersion of the following composition was obtained:

| | Percent |
|---|---|
| 440 g. polytetrafluoroethylene | 44.0 |
| 31 g. K[Zn(OH)$_3$] | [1] 3.1 |
| 22 g. Arkopal® N 090 (cf. Ex. 1) | 2.2 |
| 24 g. ammonia (NH$_3$) | 2.4 |
| 483 g. water | 48.3 |
| 1000 g. | 100.0 |

[1] Equals 7% calc. on PTFE.

A coat (10 to 20 microns) of the above dispersion was applied to the internal surface of the round of a pan of aluminum which had been carefully and uniformly degreased and pickled. This basic coat was dried in the furnace at a temperature within the range of from 170° to 200° C. After cooling, a second, somewhat thicker coat (20 to 25 microns) was applied which was also dried. The round was then placed in the sintering furnace where the coats were sintered at 380° to 390° C. for a period of from 15 to 20 minutes. The colourless coating was practically free from cracks and voids and withstood a 10 hours' hydrochloric acid test without sign of an evolution of hydrogen. The coating had an excellent adherence to the metal, the surface hardness was improved such that it could also under normal conditions of usage be worked with edgeless metal objects. The coat applied was now polished and the excellent anti-adhesive effect with respect to commodities verified by the usual tests, such as the frying of eggs without fat or the burning of milk.

EXAMPLE 4

A precipitate of 250 millimoles of zinc hydroxide was prepared as described in Example 1 from 34.2 g. (250 millimoles) of zinc chloride (ZnCl$_2$) that had been dissolved in water and 39 ml. (530 millimoles) of an ammonia solution (density 0.91 g./ml.), and this precipitate was then again dissolved in 130 ml. (1750 millimoles) of a concentrated ammonia solution. 20 g. (500 millimoles) of powdered caustic soda were added to the zinc-tetrammine-hydroxide solution obtained, the solution was stirred until the total amount of the caustic soda had dissolved, and the solution containing 250 millimoles of sodium-tetrammine-tetrahydroxo-zincate Na$_2$[Zn(NH$_3$)$_4$(OH)$_4$] was added to 750 g. of an aqueous PTFE dispersion of 60% strength.

Composition of the mixed dispersions:

| | Percent |
|---|---|
| 450 g. polytetrafluoroethylene | 41.70 |
| 45 g. Na$_2$[Zn(OH)$_4$] | [1] 4.17 |
| 23 g. Arkopal® N 090 (cf. Ex. 1) | 2.13 |
| 30 g. ammonia (NH$_3$) | 2.78 |
| 532 g. water | 49.22 |
| 1080 g. | 100.00 |

[1] 10% calc. on PTFE.

Several small dished shaped articles of a magnesium alloy were pickled with semi-concentrated hydrochloric acid, rinsed and dried. Four coats of the above dispersion were applied successively with a soft brush in as uniform a manner as possible and in such a way that the formation of blisters was avoided to as far an extent as possible. After the application of each coat, an intermediate drying was carried out at 150° C. After the last coat had been applied, the internal surface of the dished articles was provided with a very smooth, crack-free, white coat. The shaped articles were finally brought to a temperature of 380° C. in a sintering furnace for a period of 20 minutes. By this treatment, a transparent, very resistant coating was obtained that had a thickness of from approximately 50 to 70 microns which, if desired, could also be polished. A 12 hours' hydrochloric acid test was negative and proved the freedom from cracks and voids of the coats applied. The coating withstood even rough mechanical stresses.

EXAMPLE 5

A solution of 250 millimoles of zinc-tetrammine-hydroxide in aqueous ammonia was prepared in a manner analogous to that described in Example 4 and 12 grams (500 millimoles) of lithium hydroxide were dissolved therein, with agitation. The solution of 250 millimoles of lithium-tetrammine-tetrahydroxo-zincate, Li$_2$[Zn(NH$_3$)$_4$(OH)$_4$] obtained was mixed with 820 g. of a PTFE-dispersion of about 60% strength.

Composition of the mixture:

| | Percent |
|---|---|
| 490 g. polytetrafluoroethylene | 42.00 |
| 37 g. Li$_2$[Zn(OH)$_4$] | [1] 3.17 |
| 25 g. Arkopal® N 090 (cf. Ex. 1) | 2.14 |
| 30 g. ammonia (NH$_3$) | 2.57 |
| 585 g. water | 50.12 |
| 1167 g. | 100.00 |

[1] Equals 7.5% calc. on PTFE.

An alkaline-tetrammine-tetrahydroxo-zincate solution was spread several times successively on ordinary porous clay dishes. The solution was each time rapidly absorbed by the clay. After a short intermediate drying process at 150° C., a coat of the above-described PTFE-dispersion was sprayed onto the dishes pretreated in this manner, the coat was dried in the drying cabinet at 150° C. and the dishes were placed for 15 minutes in the sintering furnace heated at 390° C. The clay dishes were thus provided with a well adhering, durable and colourless coat (12 to 25 microns) of PTFE. Water applied no longer wetted the coat and lay in large ball-shaped drops on the surface of the dish. Moreover, the dish was no longer permeable to water.

EXAMPLE 6

57.5 g. (200 millimoles) of zinc sulfate ($ZnSO_4 \cdot 7H_2O$) were dissolved, with agitation, in 125 milliliters of water to give a clear solution, and 80 grams (1310 millimoles) of ethanolamine were added to this solution at room temperature. In the course of this reaction, zinc hydroxide precipitated at first which, however, rapidly dissolved again in the excess amount of ethanolamine. 15.5 g. (209 millimoles) of finely powdered calcium hydroxide were added in portions to the limpid solution of the complex salt, and the mixture was stirred for 2 to 3 hours without any addition of heat. The solution was filtered off with strong suction from the sparingly-soluble calcium sulfate formed and was rewashed with 25 to 30 ml. of weak ammonia water. The limpid solution thus obtained, which contained approx. 20 grams (200 millimoles) of zinc hydroxide in the form of a soluble ethanolamine complex, was stirred into 475 grams of a PTFE-dispersion of 60% strength. There were thus obtained 720 grams of a PTFE-dispersion which could be applied to the substrate by spray-coating, spread-coating or dip-coating and which yielded entirely smooth, crack-free coatings of good strength.

The composition of the dispersion ready for use was as follows:

|   | Percent |
|---|---|
| 285 g. polytetrafluoroethylene | 39.60 |
| 20 g. zinc hydroxide | [1] 2.78 |
| 80 g. ethanolamine | 11.10 |
| 14 g. wetting agent Arkopal[®] N 090 (cf. Ex. 1) | 1.92 |
| 321 g. water | 44.60 |
| 720 g. | 100.00 |

[1] Equals 7% calc. on PTFE.

This dispersion was uniformly spread on pickled aluminum sheets in such a way that the formation of blisters was avoided. The first coat was briefly subjected to an initial drying at 200° C. A second somewhat thicker coat was applied with the direction of spreading being changed by 90°, and the coat was also dried at 200° C. Then the coated sheets were placed in the sintering furnace and sintered at 380° to 390° C. for a period of from 15 to 20 minutes. The coat produced showed, on cooling, an excellent adhesion and withstood the cross-cutting test without damage to the fields. No cracks could be detected under the microscope even in the case of a sixty- to hundredfold magnification. The hydrochloric acid test was likewise negative.

EXAMPLE 7

The batch was prepared as described in Example 6 except that there was finally chosen a different ratio with respect to the dispersion.

The solution containing approx. 20 g. (200 millimoles) of zinc hydroxide $Me_2^I[Zn(NH_3)_4(OH)_4]$ in the form of a complex compound was stirred into 333 grams of a PTFE-dispersion of 60% strength. A dispersion was obtained which could be worked well as regards the technique of spray-coating and which had the following composition:

|   | Percent |
|---|---|
| 200 g. polytetrafluoroethylene | 34.50 |
| 20 g. zinc hydroxide | [1] 3.45 |
| 10 g. Arkopal[®] N 090 (cf. Ex. 1) | 1.72 |
| 80 g. ethanolamine | 13.80 |
| 270 g. water | 46.53 |
| 580 g | 100.00 |

[1] Equals 10% calc. on PTFE.

With this dispersion coats having a thickness of from 20 to 40 microns were sprayed not only on polished but also on pickled aluminum sheets, the coats were dried for 20 minutes at 200° C. and sintered for 15 minutes in the sintering furnace at 380° to 390° C. After cooling, the excellent adherence of the PTFE coat to the substrate could be examined on the pickled sheets by means of the cross-cutting test while the films which could be peeled off from the polished sheets showed substantial freedom from cracks and voids under the microscope with a sixty- to hundredfold magnification. It was not possible for a drop of concentrated hydrochloric acid applied to such a coat to contact the metal through voids or cracks, which would easily have been recognizable by the evolution of small gas bubbles (evolution of hydrogen). The drop of hydrochloric acid remained without bubbles until it had evaporated in the course of several hours.

EXAMPLE 8

50 grams (200 millimoles) of copper sulfate $$CuSO_4 \cdot 5H_2O$$

were dissolved, while heating gently, in 125 ml. of water. 73.4 g. (1200 millimoles) of ethanolamine were added to this solution. 16 g. (216 millimoles) of finely powdered calcium hydroxide were added in portions to the deep-blue limpid solution of copper(II) - tetraethanolamine-sulfate, while stirring vigorously. The reaction mixture was stirred for 2 to 3 hours, without heating externally, the solution was filtered off with suction from the sparingly-soluble calcium sulfate that had formed, and the precipitate was washed with a small quantity of ammoniacal water. The deep-blue, limpid solution of copper(II)-tetraethanolamine-hydroxide, which had a content of $Cu(OH)_2$ of 19.5 g. (200 millimoles), was added, while stirring, to 385 g. of a PTFE-dispersion concentrated to 59.8% of solid matter. There were obtained 640 g. of a cobalt-blue PTFE dispersion suitable for spraying and spreading which exhibited an excellent storage stability. The dispersion had the following composition:

|   | Percent |
|---|---|
| 230.0 g. polytetrafluoroethylene | 36.00 |
| 19.5 g. copper hydroxide | [1] 3.05 |
| 11.6 g. wetting agent Arkopal[®] N 090 (cf. Ex. 1) | 1.80 |
| 73.4 g. ethanolamine | 11.45 |
| 305.5 g. water | 47.70 |
| 640.0 g. | 100.00 |

[1] Equals 8.5% calc. on PTFE.

One or several coats of the above dispersion were applied successively in the conventional manner by spray-coating, dip-coating or spread-coating to aluminum sheets pickled with hydrochloric acid and to brass- and copper plates pickled with semi-concentrated nitric acid. Also iron plates that had been pretreated by sand-blasting were coated in this manner. The feebly bluish coats were dried in the drying cabinet at 200° C. and the coated plates placed for a period of from 15 to 20 minutes in the sintering furnace heated at 380° to 390° C. Very smooth, crack-free coats were obtained which adhered strongly to the substrate. Provided that the PTFE coat had been carefully applied and that the coat had a sufficient thickness, the hydrochloric acid test was also in this case mostly negative. The top coatings and the coats had a warm, dark-brown colour due to the embedded copper oxide which had formed. When applied to polished metal surfaces and subjected to a sintering process, coats were obtained which could be peeled off in the form of very smooth, brown, crack-free films. They exhibited a considerable tensile strength.

EXAMPLE 9

In a manner analogous to that described in Example 6, 51.4 g. (200 millimoles) of cadmium sulfate $$(3CdSO_4 \cdot 8H_2O)$$

125 ml. of water, 80 g. (1310 millimoles) of ethanolamine and 16 g. (216 millimoles) of calcium hydroxide were stirred for 3 hours. The limpid, colourless solution, which had been separated from the calcium sulfate, which contained approx. 29 g. (200 millimoles) of cadmium hydroxide in the form of a soluble ethanolamine complex, was then added, while stirring, to 500 g. of a PTFE-dispersion of 60% strength. The dispersion which was ready for use contained:

|  | Percent |
|---|---|
| 300 g. polytetrafluoroethylene | 38.70 |
| 29 g. cadmium hydroxide | [1] 3.74 |
| 80 g. ethanolamine | 10.33 |
| 15 g. PF 40 [2] as a wetting agent | 1.93 |
| 351 g. water | 45.30 |
| 775 g. | 100.00 |

[1] Equals 9.7% calc. on PTFE.
[2] PF 40 is an oxethylated polypropylene oxide.

Metal surfaces were successfully coated with the above dispersion in the conventional manner and the coats tested as to adhesion, freedom from cracks and film-forming properties by the methods as described above.

EXAMPLE 10

72 g. (250 millimoles) of zinc sulfate($ZnSO_4 \cdot 7H_2O$) were dissolved in 150 ml. of water and, after the addition of 100 g. (1636 millimoles) ethanolamine, stirred for 3 hours, 20 g. (270 millimoles) of calcium hydroxide being added in portions during the first hour. After 3 hours, the solution was filtered off with suction from the precipitate, the precipitate was rewashed and 200 g. of formamide were added to the limpid, colourless solution. The solution obtained was placed in a flask and the water (160 to 170 ml.) was evaporated carefully by means of a vacuum rotary evaporator. 500 g. of an anhydrous PTFE-dispersion in formamide, which had a PTFE content of 50%, were added to the practically anhydrous solution of the zinc-hydroxide-ethanolamine complex in formamide. An anhydrous, primer-containing PTFE-dispersion was obtained that had the following composition:

|  | Percent |
|---|---|
| 250 g. polytetrafluoroethylene | 30.30 |
| 25 g. zinc hydroxide | [1] 3.03 |
| 25 g. Arkopal® N 090 (cf. Ex. 1) | 3.03 |
| 100 g. ethanolamine | 12.10 |
| 425 g. formamide | 51.54 |
| 825 g. | 100.00 |

[1] Equals 10% calc. on PTFE.

which may, in special cases, be even superior to the aqueous dispersions.

EXAMPLE 11

The solutions of the metal hydroxide-ethanolamine complexes prepared in the manner as described in Examples 6, 8 or 9 were freed from water and a small quantity of excess ethanolamine in the vacuum rotary evaporator at 50° to 60° C. A viscous oil remained in the flask which, after cooling, solidified with the formation of crystals. In this manner some of the metal hydroxide complexes used according to the invention could be obtained in a solid form and, consequently, the primer could be added to the dispersions, which had been rendered ammoniacal or which contained amine, only a short time prior to the application of the coat.

EXAMPLE 12

19.5 g. (200 millimoles) of dry copper(II)hydroxide ($Cu(OH)_2$) were added to 92 g. (1500 millimoles) of ethanolamine. This mixture was stirred vigorously for some time, the major part of the $Cu(OH)_2$ passing into solution as a complex compound with a deep-blue colour. Then 400 grams of a PTFE dispersion of 50% strength in anhydrous formamide were added thereto and the total mixture was stirred until the total amount of $Cu(OH)_2$ had passed into solution so that a blue solution was obtained which had the following composition:

|  | Percent |
|---|---|
| 200 g. polytetrafluoroethylene | 39.0 |
| 20 g. $Cu(OH)_2$ | [1] 3.9 |
| 20 g. Arkopal® N 090 (cf. Ex. 1) | 3.9 |
| 92 g. ethanolamine | 18.0 |
| 180 g. formamide | 35.2 |
| 512 g. | 100.00 |

[1] Equals 10% calc. on PTFE.

This dispersion was applied in the manner as described, for example, in Examples 8 and 10.

We claim:
1. A polytetrafluoroethylene aqueous dispersion containing from 0.2 to 50% by weight based on the polytetrafluoroethylene of a complex compound soluble in said dispersion and from 25 to 60% by weight polytetrafluoroethylene, said complex compound being (a) a complex of a metal hydroxide selected from the group consisting of copper hydroxide, cadmium hydroxide and zinc hydroxide with 2 to 6 mols per mol of the metal hydroxide of a member selected from the group consisting of ammonia, an alkylamine, an alkanol amine and hydrazine or (b) a hydroxozincate.
2. The dispersion of claim 1 wherein the complex compound is a tetrammine of the metal hydroxide.
3. The dispersion of claim 1 wherein the complex compound is of a metal hydroxide with hydrazine, methylamine, hexylamine or ethanolamine.
4. The dispersion of claim 1 wherein the complex compound is an alkali-trihydroxo-zincate, an alkali-tetrahydroxyozincate or an ammonia or amine complex of said zincates.

References Cited

UNITED STATES PATENTS 2,562,117  7/1951  Osdal _____ 260—92.1
2,825,664  3/1958  Huntsberger _____ 260—29.6F HARRY WONG, Jr., Primary Examiner U.S. Cl. X.R.

117—123, 124, 132; 260—92.1